United States Patent [19]

Davis et al.

[11] 4,272,555

[45] Jun. 9, 1981

[54] CONVERSION OF CARBON-CONTAINING MATERIALS TO CARBON MONOXIDE

[75] Inventors: George D. Davis, Creve Coeur, Mo.; James C. Hill, Seabrook, Tex.; Talmage D. McMinn, Des Peres; Charles W. Rooks, St. Louis, both of Mo.

[73] Assignee: Monsanto Company, St. Louis, Mo.

[21] Appl. No.: 77,694

[22] Filed: Sep. 21, 1979

[51] Int. Cl.³ .............................................. C01B 31/18
[52] U.S. Cl. ................................ 423/415 A; 252/373; 48/197 R
[58] Field of Search .................... 423/415 R, 415 A; 252/373; 48/197 R

[56] References Cited

U.S. PATENT DOCUMENTS

| 1,027,681 | 5/1912 | Williams | 423/415 A |
| 2,592,377 | 4/1952 | Barr et al. | 423/415 A X |
| 2,602,809 | 7/1952 | Dickinson | 423/415 A X |

Primary Examiner—Earl C. Thomas
Attorney, Agent, or Firm—Paul L. Passley; James C. Logomasini; Stanley M. Tarter

[57] ABSTRACT

Carbon-containing materials are gasified to produce high purity carbon monoxide in a three zone unified system (oxidizer, reducer and gasifier) using a metal oxide as the oxygen and heat source for the gasification with carbon monoxide. Carbon monoxide contacts the metal oxide prior to the gasification to release the oxygen and convert the carbon monoxide to carbon dioxide as the gasification medium.

13 Claims, 1 Drawing Figure

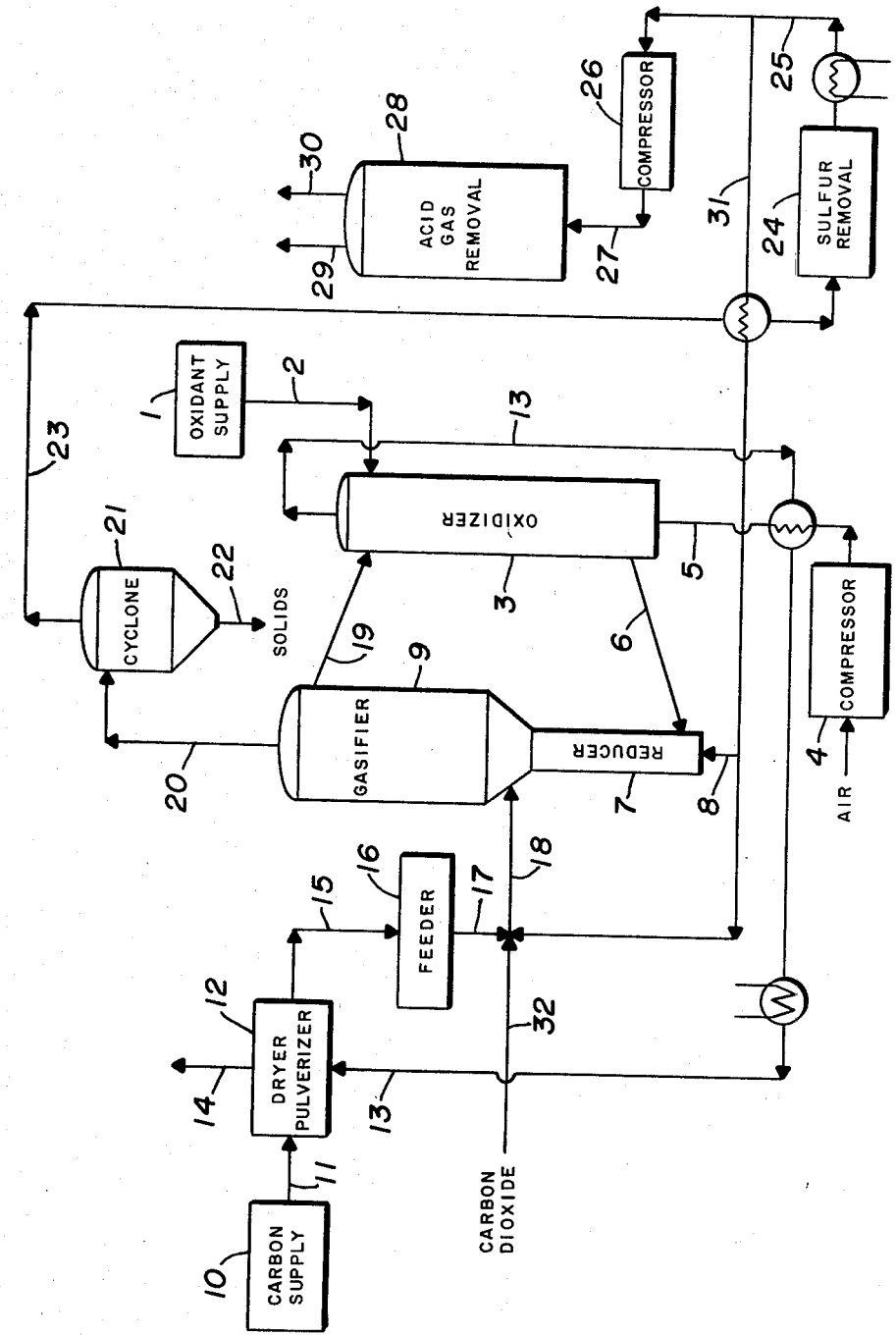

CONVERSION OF CARBON-CONTAINING MATERIALS TO CARBON MONOXIDE

BACKGROUND OF THE INVENTION

This invention relates to the treatment of carbon-containing materials. In one aspect this invention relates to the treatment of carbon-containing materials, such as coal and coke to produce oxides of carbon therefrom. In still another aspect this invention relates to a process for the production of high purity carbon monoxide from carbon-containing materials.

Coal and coke may be treated with oxygen at relatively high temperatures to convert the coal or coke to carbon oxides, which is useful for various purposes including the synthesis of organic compounds therefrom. The heat released by gasifying coal with relatively pure oxygen tends to be excessive. As the result, steam and oxygen are normally used together in such proportions that the net reaction heat is sufficient to maintain the desired temperatures for the gasification of the coal or coke. In using the combination of steam and oxygen in the above manner the oxygen may be used in a substantially pure form and by such method the process is continuous, thermally efficient, but produces a gas comprising hydrogen and carbon monoxide. The use of oxygen is an economic burden and increases process complexity. If the oxygen is to be supplied to the process as air rather than as purified oxygen, the economic advantages obtained by using air is obviated by the fact that product gas contains large amounts of diluent nitrogen. It is desirable, therefore, to provide a process which eliminates purification of the oxygen but produces a gas substantially free from nitrogen.

U.S. Pat. No. 2,602,809 discloses the gasification of solid carbon containing materials using metal oxides, such as $Fe_3O_4$ or $Fe_2O_3$, which serve as the principal source of oxygen for the reaction. The process disclosed employs a counter-current flow of coal and metal oxide in a fluidized state in a reactor for effecting reduction of the metal oxide to release oxygen and effecting oxidation of the coal with the released oxygen to form carbon oxides. The reduced metal oxide is reoxidized for reuse with air whereby it is heated by the heat from the exothermic air oxidation reaction.

SUMMARY

This invention provides a unified process for producing high purity carbon monoxide from carbon-containing materials. In this process a metal-oxygen containing material is used as the transfer agent of oxygen and heat for oxidatively gasifying carbon-containing material. The metal-oxygen containing material can be characterized as a heat and oxygen carrier and is herein referred to generally as an oxidant. In a major aspect of this invention, carbon dioxide is employed to fluidize and transport the oxidant through an upflow, co-current system. Carbon monoxide is first oxidized and heated by the oxidant to form carbon dioxide in an oxidant reducing zone prior to contact of the oxidant and gases with the carbon-containing material in a gasifying zone. The carbon-containing materials are oxidized to predominantly carbon monoxide via the reaction of one mole of carbon dioxide reacting with one mole of carbon to provide two moles of carbon monoxide. The gasification is conducted according to this invention in such a manner that the nitrogen contained in the air used to reoxidize the reduced oxidant does not contaminate the product gas. The gasification of the carbon-containing materials is accomplished by the alternate oxidation and reduction of a fluidized oxidant. After the gasification, the reduced oxidant which may be in the form of the elemental metal or lower oxidized state is reoxidized in an oxidizing zone and the cycle repeated. As used herein, reduced oxidant refers to either elemental metal or a lower oxidation state resulting from the reduction of the oxidant.

Typical objects of this invention are (1) to provide a process for gasifying carbon-containing materials, (2) to provide a process for converting carbon-containing materials to carbon oxides, (3) to provide a process for the production of carbon monoxide, and (4) to provide an improved process for the gasification of carbon-containing materials wherein heated oxidant is at least partially reduced with carbon monoxide with the formation of carbon dioxide prior to contact with the carbon-containing material and gasification thereof.

Various other objects, aspects and advantages of this invention will become apparent to those skilled in the art from the accompanying description, drawings and appended claims.

According to this invention, a three zone system is employed wherein an oxidant such as iron chromite ore, at an elevated temperature, is fluidized and at least partially reduced by carbon monoxide in a reducing zone with the formation of carbon dioxide. The partially reduced oxidant and associated gases move under fluidized conditions to a gasifying zone where contact with carbon-containing material is made under conditions whereby the carbon-containing material is oxidized to carbon oxides, mainly to carbon monoxide. The gaseous effluent from the gasifying zone is removed for purification and the reduced oxidant is transferred to an oxidizing zone where it is contacted with air under conditions to reoxidize and heat the oxidant. A portion of the heat liberated by the air oxidation is stored as sensible heat in the oxidant which provides heat for the reducing and gasifying zones. The heated reoxidized oxidant is returned to the reducing zone.

In the preferred method of operation of the various zones, particulate oxidant is maintained fluidized and continuously circulated through the reaction system. Throughout the gasifying zone linear gas velocities are maintained such that the solid materials are entrained in the gases. Gas velocities above about ten (10) feet per second are employed for such operation. Actual gas velocities employed will be dependent upon the size, shape and densities of the solid materials employed. In this type of operation, means will be provided externally of the gasifying zone for separating solid materials entrained in the gaseous effluent withdrawn from the gasifying zone.

The oxidant usable in the present invention will generally be a particulate material of a size capable of fluidization comprising a metal oxide which is reducible and reoxidizable under the conditions of operation of the system. Various metal oxides and metal oxide-containing materials may be used as the oxidant for providing oxygen to the reducing and gasifying zones. Suitable oxidant materials contain oxides of iron, cobalt, nickel, molybdenum, manganese, barium, vanadium, chromium, copper and mixtures thereof. Natural occurring ores, such as iron chromite ore containing iron oxide may be used as an oxidant. Oxidants applicable to this invention are more fully described in copending application, Ser. No. 06/077,692 filed Sept. 21, 1979, the disclosure of which is incorporated herein by reference.

The temperature employed in the reduction and gasification can vary over a wide range. Preferably, such reaction will be conducted from 800° C. to 1200° C. Pressure on the system can also vary. The system can be operated under pressures from 5 psig to 2000 psig.

As previously indicated, the process of this invention utilizes an upflow fluidized system with the oxidant and carbon-containing material flowing cocurrent. The fluidization and transportation of the materials are obtained by introducing a carrier gas into the system. The carrier gas can be inert to the various reactions, but preferably is carbon dioxide which enters into the reaction and thus eliminates excess gas handling. The carrier gas is introduced at such rates to fluidize and transport the materials and to maintain turbulent flow of the materials in the system. Introduction of the gases at velocities of 10 to 30 ft/sec will generally be sufficient. However, this variable is dictated by the size, shape and density of the materials moving through the system.

This invention will be more specifically described with reference to the drawings. The FIGURE is a diagrammatic illustration of the apparatus in the system described with regard to gasifying coal.

According to the FIGURE, fresh oxidant, as needed, from supply 1 is introduced through conduit 2 to oxidizing zone 3. Air is compressed in compressor 4 and introduced through conduit 5 into the bottom of oxidizer zone 3. Oxidizing zone 3 is maintained under conditions whereby the oxidant is oxidized by oxygen from the air through an exothermic reaction. The exothermic reaction heats the oxidant. The oxidant is transported from oxidizing zone 3 through conduit 6 into the lower portion of reducing zone 7. Carbon monoxide is introduced through conduit 8 into the bottom of reducing zone 7 at such a rate to fluidize and move the oxidant upwardly through the reducing zone 7 into gasifying zone 9. In reducing zone 7 contact of the carbon monoxide with the heated oxidant causes reduction of the oxidant and the formation of carbon dioxide. Carbon material from supply 10 is introduced through conduit 11 to dryer/pulverizer 12 where it is ground to a particle size in the range of 40 to 200 microns and dried to less than 2 percent moisture by contact with the effluent from oxidizing zone 3 introduced through conduit 13. Gases from dryer/pulverizer 12 are removed through conduit 14. The dried/pulverized carbon material is fed through conduit 15 into feeder 16. The carbon material is metered from feeder 16 through conduit 17 and conduit 18 into gasifying zone 9. Additional carbon dioxide is introduced through conduit 32 to move the carbon material into gasifying zone 9. In gasifying zone 9, the carbon material is oxidized to predominately carbon monoxide through contact and turbulent mixing with the upflowing mixture of heated oxidant and gases from reducing zone 7. The reaction gases and oxidant are separated. Such separation can be accomplished by a cyclone separator positioned in the upper portion of gasifying zone 9. Reduced oxidant is removed from the upper portion of gasifying zone 9 through conduit 19 and introduced into reducing zone 3 for reoxidation and reheating. Gaseous effluent is removed from gasifying zone 9 through conduit 20 and introduced to cyclone 21. Alternatively, the reaction gases and oxidant can be removed together from gasifying zone 9 through conduit 20 and separated in a first cyclone, not shown. In this case conduit 19 would connect with the first cyclone and reducing zone 3 to convey the oxidant and the gaseous effluent would be fed to cyclone 21. The cyclone 21 entrained solids such as ash and fines are separated and removed through conduit 22 for disposal. The gaseous effluent is then fed through conduit 23 into sulfur removal zone 24. Desulfurized gaseous effluent is fed through conduit 25 into gas compressor 26. The desulfurized effluent is fed through conduit 27 to an acid gas removal zone 28 where carbon dioxide is removed through conduit 29 and substantially pure carbon monoxide is removed through conduit 30. Carbon dioxide removed through conduit 29 may be returned to the gasifying zone 9 for further reaction with carbon according to this invention so that ultimately the carbon in the carbon material is totally gasified to carbon monoxide. A portion of the carbon monoxide effluent from sulfur removal zone 24 is fed through conduits 31 and 8 to the reducing zone 7 and through conduits 31 and 18 to transport carbon material to the gasifying zone 9. As shown in the drawing, heat exchange of the various gas streams may take place. Also, not shown, the solid oxidant and carbon material may be stripped with a gas such as carbon dioxide between the various zones to remove gases such as nitrogen.

Various steps and auxiliary operations, such as the dryer/pulverizer 12, feeder 16, compressors 4 and 26, cyclone 21, sulfur removal 24 and acid gas removal 28 are well known standard operations and need not be further described here.

The particle size of the carbon-containing material, if a solid, and oxidant, employed in the process of this invention may vary over a wide range. However, the solids will generally be employed in a particle size ranging from 40 to 200 microns.

Any low hydrogen content carbon-containing material may be gasified in accordance with this invention. It is particularly useful for the gasifying solid carbon-containing materials such as coke, coke breeze, chars and the like. Chars of coals of rank from lignite through anthracite are particularly suitable.

EXAMPLES

The practice of this invention will now be more fully illustrated in the following Examples.

In Example 1, the reactor employed for carrying out the particular gasification runs comprises a 19¾-inch long stainless steel schedule 40 pipe with a 1.61-inch inside diameter main section fitted at the bottom with a conical section of Type 310 stainless steel 1¼ inch long and tapering to ¼-inch diameter capped at the top with a flange. Fluidizing gas and carbon-containing material is introduced through the bottom of the conical section of the reactor. Product gases are removed through the top of the reactor for analysis. The reactor is enclosed in an insulated electric resistance heater.

EXAMPLE 1

This Example illustrates the gasification of various carbon-containing materials using carbon monoxide as the gasifying agent and iron chromite ore from the Transvaal mines of South Africa as the oxidant.

In each run, the reactor contains 580 grams (75 to 350 microns) of oxidant fluidized with nitrogen. The oxidant is maintained at a temperature of 1050° C. The carbon-containing material is fed to the reactor along with approximately 1.5 L/min of carbon dioxide as the gasifying agent. Each run is continued for about 15 minutes with reaction gases periodically sampled and analyzed. The gas velocity in the reactor is approximately 0.3 ft/sec and the gas/solid contact time is approximately 1.9 sec. The results for each particular material tested are given in the following Table 1 where Production is the cubic feet of gas produced per pound of material converted.

TABLE 1

| RUN | CARBON MATERIAL | FEED RATE (gm/min) |
|---|---|---|
| A | Kentucky Coal Char | 1.06 |
| | (75.8 wt. % carbon - 1.2 wt. % Hydrogen) | |
| B | U.S. Steel Clean Coke | 1.005 |
| | (83.5 wt. % carbon - 1.4 wt. % Hydrogen) | |

| RUN | TIME (min) | PRODUCTION ft³/lb | PRODUCT MOLE % CO | PRODUCT MOLE % $CO_2$ | CARBON CONVERSION MOLE % |
|---|---|---|---|---|---|
| A | 1 | — | 0.46 | 99.54 | 29.8 |
| | 3 | 9.6 | 6.88 | 93.12 | 55.8 |
| | 5 | 9.7 | 6.56 | 93.44 | 52.2 |
| | 7 | 8.8 | 10.11 | 89.31 | 44.7 |
| | 9 | 9.3 | 32.99 | 67.01 | 41.0 |
| | 11 | 9.3 | 49.29 | 50.71 | 37.3 |
| | 13 | 10.4 | 51.58 | 47.75 | 41.0 |
| B | 1 | — | 0.55 | 99.45 | 15.8 |
| | 3 | 8.8 | 3.41 | 96.59 | 25.0 |
| | 5 | 9.5 | 4.64 | 95.36 | 46.5 |
| | 7 | 9.2 | 5.83 | 93.78 | 50.1 |
| | 9 | 7.6 | 33.85 | 66.15 | 55.0 |
| | 11 | 7.9 | 45.22 | 54.78 | 50.0 |
| | 13 | 11.5 | 51.44 | 48.27 | 39.3 |
| | 15 | 10.3 | 57.50 | 42.50 | 35.8 |

After removal of $CO_2$, the product gases in Run A contained 93% CO and 7% $H_2$ and in Run B 95% CO and 5% $H_2$.

EXAMPLE 2

This Example with reference to the drawing illustrates the continuous gasification of coal char according to this invention. Iron chromite ore is circulated at the rate of 190 gm/min through the oxidizing zone 3, conduit 6, reducing zone 7, gasifying zone 9 and conduit 19. The ore-containing FeO entering oxidizing zone 3 through conduit 19 is contacted with air fed to the bottom of the oxidizing zone 3 at the rate of 11.2 L/min and 8.9 L/min of nitrogen is withdrawn from the top of oxidizing zone 3 through conduit 13. The exothermic oxidation taking place in oxidizer 3 provides 65.8 kcal/mole of FeO oxidized and heats the ore to 1150° C. and oxidizes the FeO to $Fe_2O_3$. The ore-containing $Fe_2O_3$ is removed from oxidizer 3 through conduit 6 and introduced into reducing zone 7. Carbon monoxide is fed through conduit 8 into reducing zone 7 at the rate of 4.48 L/min. The $Fe_2O_3$ is reduced by the carbon monoxide producing $CO_2$. The reduction is approximately thermoneutral whereby the temperature in reducing zone 7 is 1135° C. The reduced ore and gases flow into gasifying zone 9 to which 2.94 gm/min of finely divided Illinois #6 coal char is introduced through conduit 18. The gasification of the coal char with the ore and $CO_2$ is endothermic and requires 40.0 kcal/mole whereby the temperature in gasifying zone 9 is 1025° C. The reduced ore-containing FeO is withdrawn from gasifying zone 9 and introduced through conduit 19 again into oxidizing zone 3. The gasifying zone 9 effluent is removed through conduit 20 at the rate of 9 L/min and contains 15 mole percent $CO_2$, 84.8 mole percent CO and 0.2 mole percent $H_2$. As used in this Example and invention, FeO means a mixture of iron oxides having an average oxygen to iron ratio of 1.0 to 1.2 and $Fe_2O_3$ means a mixture of iron oxides having an average oxygen to iron ratio of 1.4 to 1.6.

What is claimed is:

1. A continuous process for the gasification of carbon-containing materials in a fluidization system comprising a reduction zone and a gasification zone which comprises:
   (a) introducing particulate solid oxidant at an elevated temperature into said reduction zone,
   (b) introducing carbon monoxide substantially devoid of free oxygen into said reduction zone at such a rate to fluidize said oxidant and cause it to move upwardly through said system,
   (c) maintaining said reduction zone under conditions such that said oxidant is reduced and said carbon monoxide is oxidized to gaseous carbon dioxide,
   (d) introducing carbon-containing material into said gasification zone whereby said carbon-containing material is entrained in and mixed with said upward moving oxidant and gaseous carbon dioxide,
   (e) maintaining said gasification zone under conditions such that said carbon-containing material and carbon dioxide are endothermically reacted to carbon monoxide, and
   (f) withdrawing a gaseous effluent comprising carbon monoxide from said gasification zone.

2. The process of claim 1 wherein said carbon-containing material is coal char.

3. The process of claim 1 wherein said carbon-containing material is coke.

4. The process of claim 1 wherein said oxidant is a natural or synthetic metal oxide-containing material.

5. The process of claim 4 wherein said material is iron chromite ore.

6. The process of claim 4 wherein said material contains iron oxide.

7. The process of claim 1 wherein the temperatures maintained in said reduction and gasification zones are from 800° C. to 1200° C.

8. The process of claim 1 wherein the superficial gas velocity in the reduction and gasification zones is above 10 feet per second.

9. A continuous process for the gasification of low hydrogen containing carbon-containing materials in a fluidization system comprising a reduction zone and a gasification zone and an associated oxidation zone which comprises:
   (a) introducing particulate solid oxidant at an elevated temperature into said reduction zone,
   (b) introducing carbon monoxide substantially devoid of free oxygen into said reduction zone at such a rate to fluidize said oxidant and cause it to move upwardly through said system,
   (c) maintaining said reduction zone under conditions such that said oxidant is reduced and said carbon monoxide is oxidized to gaseous carbon dioxide,
   (d) introducing carbon-containing material into said gasification zone whereby said carbon-containing material is entrained in and mixed with said upward moving oxidant and carbon dioxide,
   (e) maintaining said gasification zone under conditions such that carbon-containing material and carbon dioxide are endothermically reacted to carbon monoxide,
   (f) withdrawing a gaseous effluent comprising carbon monoxide from said gasification zone, (g) withdrawing from said gasification zone and introducing into said oxidation zone said reduced oxidant, (h) introducing an oxidizing gas into said oxidation zone, (i) maintaining said oxidation zone under exothermic conditions such that said oxidant is reoxidized to a higher oxidized state and reheated to an elevated temperature sufficient to effect oxidation of said carrier gas and gasification of said carbon-containing material, and (j) withdrawing from said oxidation zone and introducing into said reduction zone said reoxidized heated oxidant.

10. The process of claim 9 wherein (a) said oxidant is a synthetic or natural occurring metal oxide-containing material, (b) said reduction zone is maintained at 800° C. to 1200° C., (c) said carbon-containing material is a char of coal of rank from lignite through anthracite, (d) said oxidation zone is maintained at 800° C. to 1100° C., and (e) said oxidizing gas is air.

11. The process of claim 10 wherein said material is iron oxide containing.

12. The process of claim 11 wherein said material is iron chromite ore.

13. The process of claim 9 wherein the gas velocities maintained in said reduction and gasification zones is about 10 feet per second.

* * * * *